(12) United States Patent
Isenhour et al.

(10) Patent No.: US 9,097,864 B2
(45) Date of Patent: Aug. 4, 2015

(54) FIBER OPTIC CONNECTOR ASSEMBLIES HAVING A REVERSE OPTICAL FIBER LOOP

(71) Applicant: CORNING OPTICAL COMMUNICATIONS LLC, Hickory, NC (US)

(72) Inventors: Micah Colen Isenhour, Lincolnton, NC (US); Dennis Michael Knecht, Hickory, NC (US); James Phillip Luther, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 14/242,198

(22) Filed: Apr. 1, 2014

(65) Prior Publication Data
US 2014/0212095 A1    Jul. 31, 2014

Related U.S. Application Data

(63) Continuation of application No. PCT/US2012/058876, filed on Oct. 5, 2012.

(60) Provisional application No. 61/543,601, filed on Oct. 5, 2011.

(51) Int. Cl.
*G02B 6/36* (2006.01)
*G02B 6/42* (2006.01)

(52) U.S. Cl.
CPC ............ *G02B 6/4204* (2013.01); *G02B 6/4214* (2013.01); *G02B 6/4284* (2013.01)

(58) Field of Classification Search
USPC ............................................ 385/78, 96, 135
See application file for complete search history.

(56) References Cited

U.S. PATENT DOCUMENTS

| 5,076,688 | A | * | 12/1991 | Bowen et al. | ................. 356/73.1 |
| 5,943,461 | A | | 8/1999 | Shahid | ............. 385/92 |
| 6,116,791 | A | | 9/2000 | Laninga et al. | ................. 385/83 |
| 7,190,865 | B2 | * | 3/2007 | Francis et al. | ................. 385/52 |
| 7,329,054 | B1 | | 2/2008 | Epitaux et al. | ................. 385/89 |
| 7,611,292 | B2 | * | 11/2009 | Graham et al. | ................. 385/75 |
| 2005/0053342 | A1 | | 3/2005 | Melton et al. | |

FOREIGN PATENT DOCUMENTS

| CN | 101675367 A | 3/2010 | |
| DE | 3235174 A1 | 3/1984 | ............... G02B 7/26 |

OTHER PUBLICATIONS

Chinese Search Report, Application No. 2012800488546, Feb. 4, 2015, 2 pages.

* cited by examiner

*Primary Examiner* — Eric Wong

(57) ABSTRACT

Fiber optic connector assemblies are disclosed that utilize a reverse optical fiber loop within the fiber optic connector to isolate the optical fiber from stresses. In one embodiment, a fiber optic connector assembly includes an optical fiber having a fiber end, and a connector housing, wherein the optical fiber enters the connector housing from a first direction and is secured within the connector housing in a second direction, thereby forming a reverse optical fiber loop that is free to expand or contract within the connector housing. In another embodiment, a fiber optic connector assembly includes an optical fiber having a fiber end, a connector housing, and a substrate within the connector housing. The optical fiber enters the connector housing over a first surface of the substrate then passes by (i.e., crosses) the first surface, and is secured within the connector housing at a second surface of the substrate.

20 Claims, 9 Drawing Sheets

FIBER OPTIC CONNECTOR ASSEMBLIES HAVING A REVERSE OPTICAL FIBER LOOP

RELATED APPLICATIONS

This application is a continuation of International Application No. PCT/US12/58876, filed Oct. 5, 2012, which claims the benefit of priority to U.S. Application No. 61/543,601, filed Oct. 5, 2011, both applications being incorporated herein by reference.

BACKGROUND

1. Field

The present disclosure generally relates to fiber optic connector assemblies for optical fiber cables and, more particularly, fiber optic connector assemblies having a reverse optical fiber loop for stress management of the optical fiber within the connector.

2. Technical Background

Fiber optic cables are an attractive alternative to bulky traditional conductor cables, especially as data rates increase. As the use of fiber optics migrates into numerous consumer electronics applications, such as connecting computer peripherals by the use of fiber optic cable assemblies, there will be a consumer driven expectation for cables having improved bandwidth performance, compatibility with future communication protocols, and a broad range of use. For example, it is likely that bandwidth demands will continue to increase with newer protocols such as universal serial bus specification version 3.0 (USB 3.0) or Thunderbolt™ owned by the Intel Corporation of Santa Clara, Calif. and that optical-based connectors will transition into these applications that previously used cable assemblies having electrical-based conductors.

During use or manufacturing, stresses on optical fibers within the fiber optic cable assembly may cause fatigue and damage to the optical fibers, as well as other components, within the fiber optic connector of the fiber optic cable assembly. Such stresses in cable assemblies having internal optical alignment components may also cause optical misalignment between the optical fibers and optical components within the connector, such as light emitting and receiving active components or the like. For example, forces applied to the optical fibers may transfer to optical components within the fiber optic connector, which has the ability to negatively affect performance. Stresses may include tensile stresses due to external forces on the optical cable, as well as changes in length due to thermal coefficient of expansion effects may also cause concerns with alignment.

SUMMARY

Embodiments of the present disclosure relate to fiber optic connectors of optical cable assemblies, such as active optical cable assemblies that convert optical signals into electrical signals, and electrical signals into optical signals. The embodiments described herein reduce stress on the optical fibers and optical components within a connector housing of the fiber optic connector by increasing the length of the optical fibers within the connector housing. More specifically, the optical fibers may enter the connector housing in a first direction, turn to form a reverse optical fiber loop, and be secured to one or more components within the connector housing in a second direction. Use of a reverse optical fiber loop within the connector housing aids in isolating forces on the optical fibers from being translated to optical components and impacting alignment of the optical signal.

In some embodiments, the second direction from the reverse optical fiber loop is opposite from the first direction, but other directions are possible. The fiber optic connector may include a substrate such as a printed circuit board (PCB) or the like such that the optical fibers enter the connector housing over a first surface of the substrate, and are secured to one or more components on the second surface of the substrate. In other words, the optical fiber enters on a first side of the substrate and is secured on the other side of the substrate. In this regard, in one embodiment, a fiber optic connector assembly includes an optical fiber having a fiber end, and a connector housing, wherein the optical fiber enters the connector housing from a first direction and is secured within the connector housing in a second direction.

In another embodiment, a fiber optic connector assembly includes an optical fiber having a fiber end, a connector housing, and a substrate within the connector housing. The substrate has a first surface and a second surface, and the optical fiber enters the connector housing over the first surface of the substrate, and is secured within the connector housing at the second surface of the substrate.

In yet another embodiment, a fiber optic connector assembly includes an optical fiber having a fiber end, a connector housing, and a substrate within the connector housing. The substrate has a first surface and a second surface, and the optical fiber enters the connector housing over the first surface of the substrate in a first direction. The fiber optic connector assembly further includes a total internal reflection (TIR) module coupled to the second surface of the substrate, and the fiber end is coupled to the total internal reflection module in a second direction. An active component is coupled to the second surface of the substrate and is optically coupled to the total internal reflection module. The active component is configured to transmit and/or receive optical signals to and/or from the optical fiber. The fiber optic connector assembly further includes an electrical connector coupled to the connector housing and electrically coupled to the active component for providing an electrical interface using an optical cable; however, the concepts disclosed herein may be used with other interfaces such as an optical interface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

BRIEF DESCRIPTION OF THE DRAWINGS

The components of the following figures are illustrated to emphasize the general principles of the present disclosure and are not necessarily drawn to scale. The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
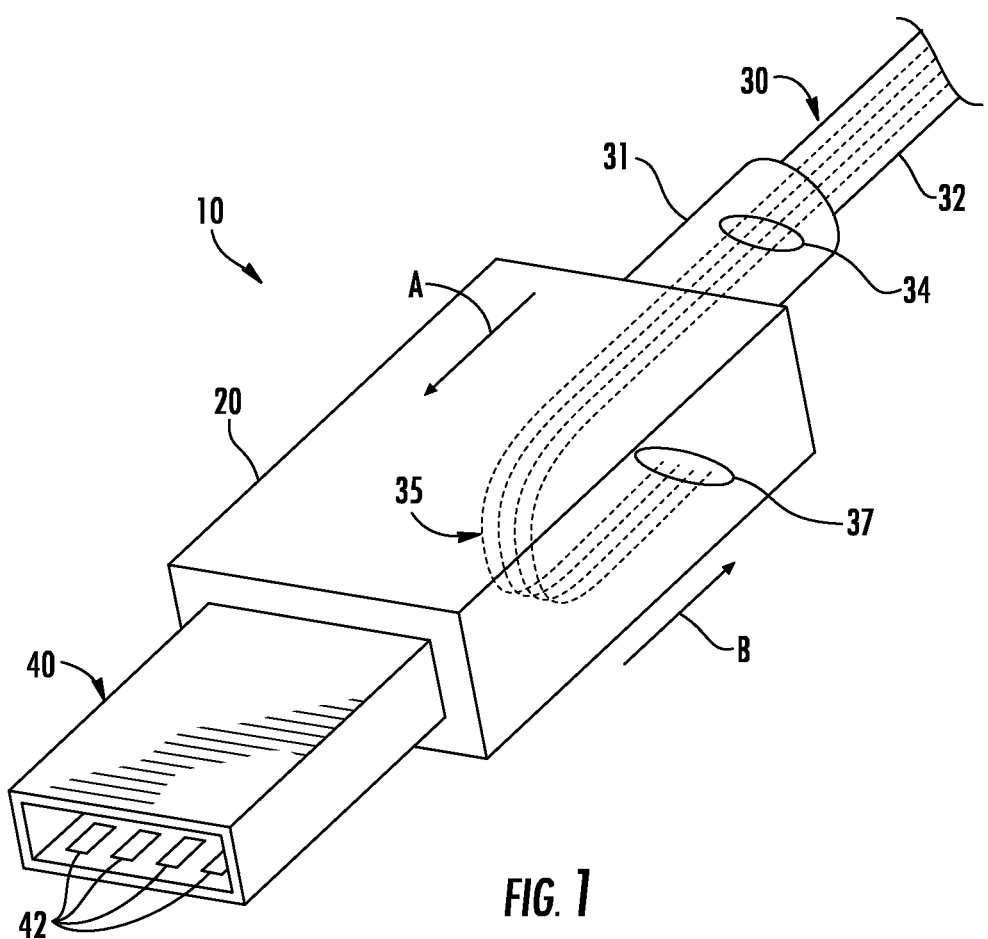
FIG. 1 schematically depicts a fiber optic connector assembly having a plurality of optical fibers that enter a connector housing in a first direction and are secured within the connector housing in a second direction.

Some aspects of the present disclosure are directed to fiber optic connectors, such as those utilized in active optical cables ("AOC") having both optical fibers as the carrier and electrical conductors as the connector interface. Using a reverse optical fiber loop within a connector body, embodiments described herein provide increased mechanical robustness by isolating the optical fiber(s) from tensile stress as well as thermal coefficient of expansion effects. Fiber motion due to external forces on the optical cable, as well as thermal effects, may damage the fiber optic connector and degrade performance. For example, tensile forces at the optical fiber termination location may cause one or more optical fibers to become decoupled from optical components within the connector, or misaligned with respect to the optical components. As described in more detail below, a reverse optical fiber loop is utilized as a demarcation element to desensitize the effect of fiber motion within the connector body such that any forces applied to the optical cable are not applied to a location where the optical fibers are coupled (i.e., secured) to optical components. As used herein, a "reverse optical fiber loop" is a loop of slack optical fiber maintained within the connector housing that is free to move within the connector housing due to external forces, such as thermal effects or tension on the optical fibers. Stated another way, the reverse optical fiber loop is a portion of the optical fiber within the connector housing that is unencumbered by components within the connector housing such that it is free to move without causing stress on optical components to which the optical fibers (or fiber) are coupled, thereby preserving the optical alignment and signal transfer.

Due to the high data rates of current communication protocols, the cable length of reasonably sized traditional passive electrical conductor cable assemblies is limited to about 3 meters or less due to skin and dielectric losses intrinsic to electrical conductors and dielectric materials. Further, conductor cables that are compatible with high-speed protocols are very bulky and put stress on the small connectors that are used on laptops and consumer devices such as camcorders, smart phones, and media players. Because of these limitations, there is a growing interest in using fiber optic cables with existing and future communication protocols, such as USB 3.0 and Thunderbolt™. A fiber optic cable may be dramatically thinner, more flexible, easier to carry for portable use, and may put much less stress on the connectors used in small, handheld devices. Additionally, a fiber optic cable assembly may span lengths longer than 3 meters such as 5 meters or more, while still allowing long, high-speed communication, which is useful in with video delivery, thin-client computing along with future high bandwidth applications.

Although the embodiments are described herein in the context of active optical cables, the embodiments are not limited thereto. The demarcation elements described herein may be utilized in any optical cable application wherein a reduction of the effects of mechanical forces on optical fibers within the connector is desired.

In this regard, FIG. 1 depicts a fiber optic connector assembly 10 of an active optical cable assembly. It should be understood that only one fiber optic connector assembly 10 is depicted in FIG. 1, and that the active optical cable assembly may include a second fiber optic connector assembly at an opposite end of the cable as desired. The fiber optic connector assembly 10 generally comprises a connector body 20, which may be defined by one or more components, such as a connector housing and an overmold, an electrical connector 40, which may be defined by a plug portion extending from the connector body 20, and an optical cable 30 including a plurality of optical fibers 34 maintained within an outer jacket 32. The electrical connector 40 comprises a plurality of electrical conductors 42 that are configured to electrically mate (i.e., provide an electrical interface) with a corresponding electrical connector, such as a receptacle of an electronic device.

The fiber optic connector assembly 10 may be configured according to any existing or yet-to-be developed connector standard. As nonlimiting examples, the fiber optic connector assembly 10 may be configured according to the USB standard, the Thunderbolt™ standard, the FireWire standard, and the like.

As shown in FIG. 1, the plurality of optical fibers 34 (or a single fiber in some embodiments) enters the connector body 20 at a rear surface 11 that is opposite from the electrical connector 40 in a first direction A. The plurality of optical fibers 34 traverses along the first direction A for a distance before reversing direction in a second direction B. The fiber ends 37 of the plurality of optical fibers 34 are affixed (i.e., secured) at a location within the connector body 20. The fiber ends 37 may terminate/affix at an optical component, such as a ferrule element, a lens assembly (e.g., a total internal reflection element), an active component (e.g., a light emitting diode, a laser diode, a photodiode, and the like). Accordingly, the plurality of optical fibers enters the connector body from a first direction A and is secured within the connector body in a second direction B. In the illustrated embodiment, first direction A is substantially opposite from second direction B (i.e., substantially 180° from one another), but other suitable directions are possible.

The change in direction of the plurality of optical fibers creates a reverse optical fiber loop 35 within the connector body 20. Use of the reverse optical fiber loop 35 may lessen the effects of optical fiber motion within the connector body 20 because length changes of the optical fibers 34 due to tension on the optical fibers 34 in the optical cable 30 (or changes in size due to thermal effects) may shorten the reverse optical fiber loop 35 without adverse effect at the optical fiber termination location. In other words, stresses are not transferred to the fiber attachment that could affect optical alignment and/or performance. The changing direction of the plurality of optical fibers 34 also allows for a longer length of optical fiber within the connector body 20, which further isolates tensile and thermal coefficient of expansion ("TCOE") effects at the optical components. In some embodiments, a length of the optical fiber defining the reverse optical fiber loop may be greater than a length of the optical connector.

Figure 2A:
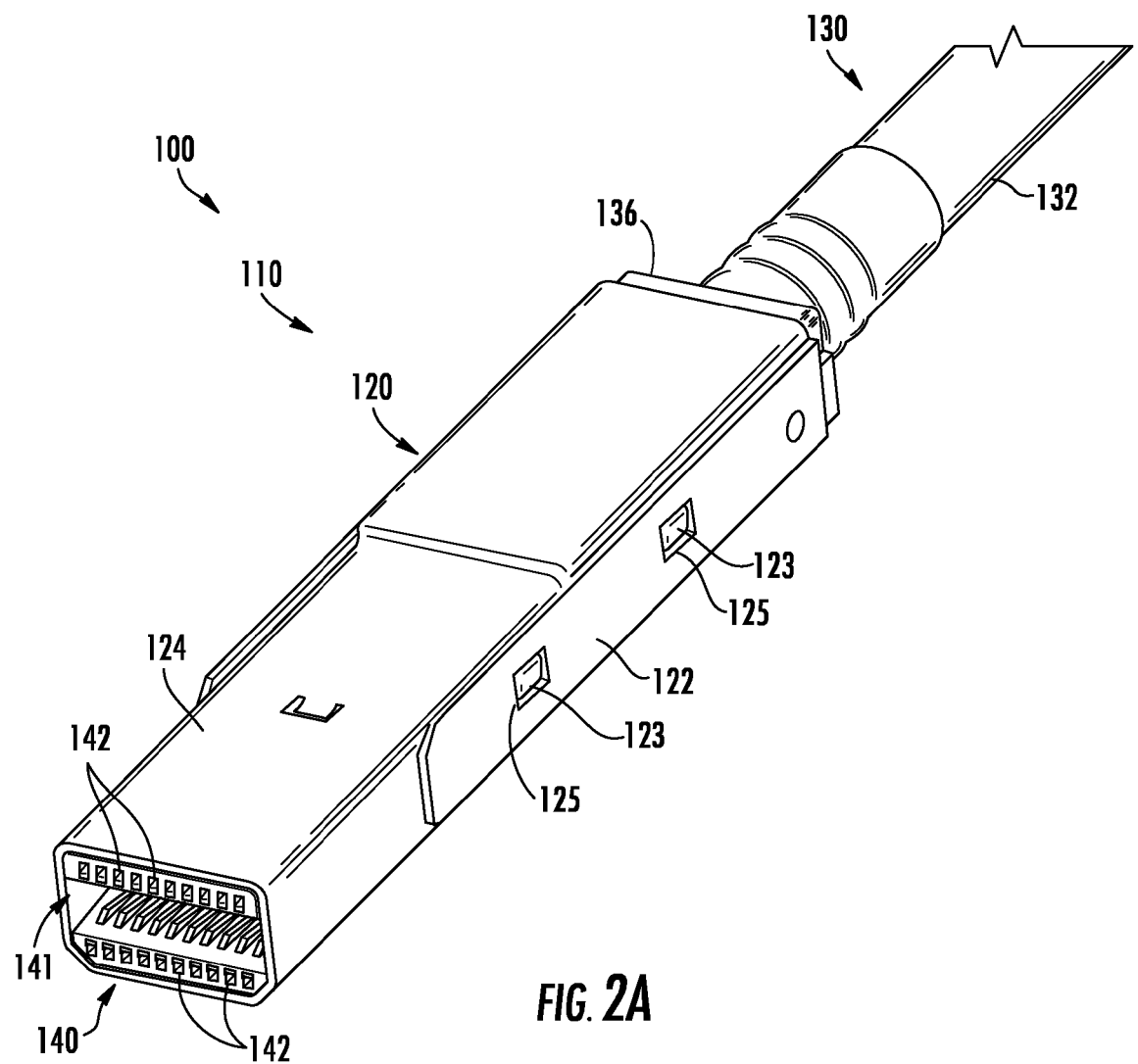
FIG. 2A is a front top perspective view of a fiber optic connector assembly of an optical cable assembly.
Figure 2B:
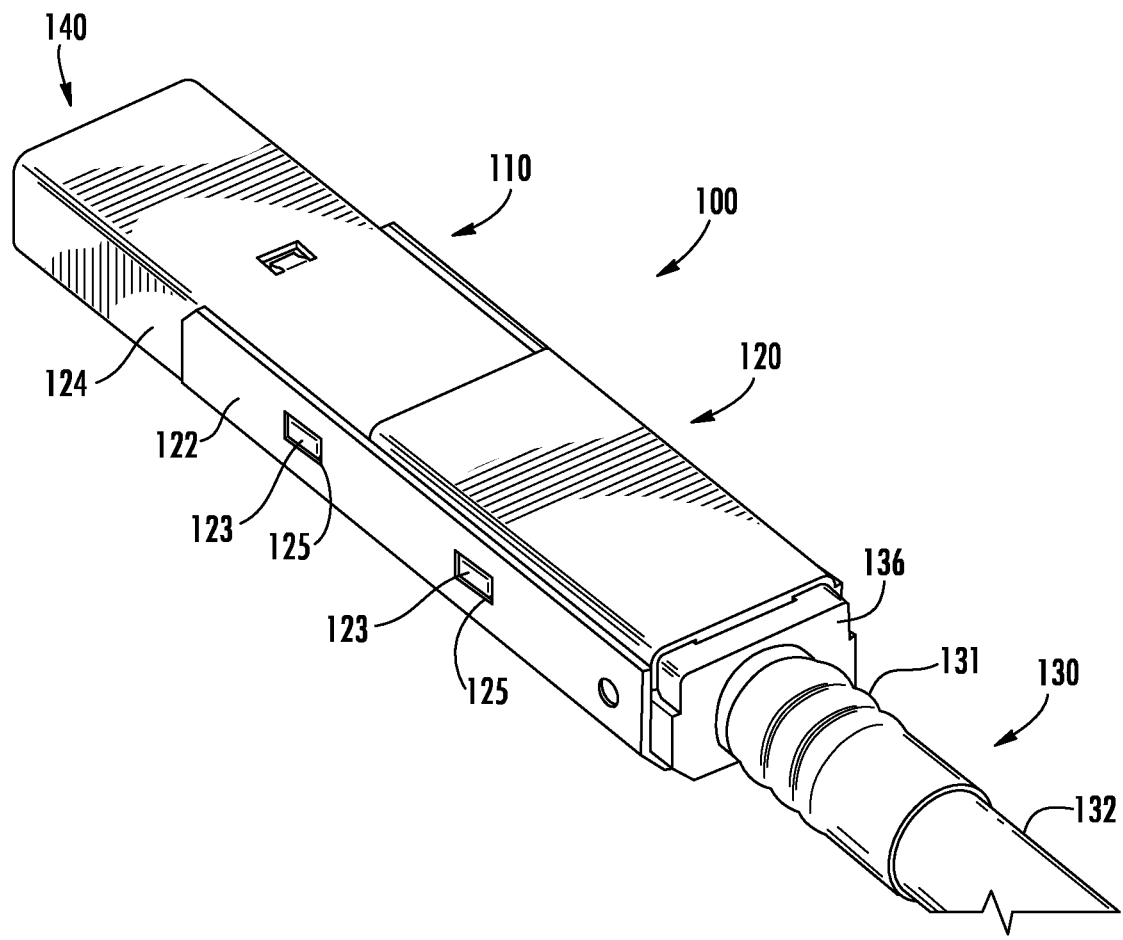
FIG. 2B is a rear top perspective view of the fiber optic connector assembly depicted in FIG. 2A.

Referring now to FIGS. 2A and 2B, an active optic cable assembly 100 having a fiber optic connector assembly 110 configured as a Thunderbolt™ active optical connector is illustrated. However, the fiber optic connector assembly 110 may be configured to be compatible with other connector standards, such as USB 3.0, FireWire, and the like. The fiber optic connector assembly 110 is coupled to an end of an optical cable 130 including a plurality of optical fibers 134 (see FIG. 3). Although not shown in FIGS. 2A and 2B, it should be understood that a second fiber optic connector assembly may be coupled to a second end of the optical cable 130.

The fiber optic connector assembly 110 comprises a connector housing 120 defined by a first connector housing half 122 and a second connector housing half 124. In other embodiments, the connector housing 120 may be configured as a unitary component. The connector housing 120 may define a connector body that further includes an overmold portion (not shown in FIGS. 2A and 2B) disposed over a portion of the connector housing 120. In the illustrated embodiment, the first connector housing half 122 and the second connector housing half 124 are mechanically coupled together by male engagement features on the second connector housing half 124 that engage female engagement features 125 on the first connector housing half 122. Other engagement features may be utilized to couple the connector housing halves.

The fiber optic connector assembly 110 includes an electrical connector 140 that is configured to mate with a corresponding receptacle connector. The receptacle connector may be present on an electronic device, such as, without limitation, a personal computer, a server computing device, a smart phone, a portable media player, a display device, a portable electronic storage device, and the like. The receptacle connector may also be present on another active optical cable assembly to couple two or more active optic cable assemblies together. The electrical connector 140 of the illustrated embodiment comprises an opening 141 that exposes a plurality of electrical contacts 142. The electrical contacts 142 are positioned and configured to be electrically coupled to the electrical contacts of the corresponding receptacle connector to pass electrical signals and/or power between the fiber optic connector assembly 110 and the electronic device associated with the receptacle connector. Although not visible in FIGS. 2A and 2B, the fiber optic connector assembly 110 includes a transceiver circuit having active components that convert electrical signals received at the electrical connector 140 into optical signals for propagation over the optical fibers 134 of the cable assembly, and optical signals received over the optical fibers 134 into electrical signals for transmission over the electrical contacts 142.

The optical cable 130 is coupled to the connector housing 120 by a cable attachment member 136 and a strain relief member 131 in the illustrated embodiment. The cable attachment member 136, which is disposed within the connector housing 120, mechanically couples the optical cable 130 to the connector housing 120, and the strain relief member 131 alleviates stress on the optical cable 130 near the attachment of the optical cable to the connector housing 120. In some embodiments, the cable attachment member 136 and the strain relief member 131 may be configured as a single, unitary component. In other embodiments, the cable attachment member 136 and the strain relief member 131 may be configured as separate components. In yet other embodiments, the strain relief member 131 may not be included. It should be understood that other optical cable attachment structures and configurations may be utilized.

Figure 3:
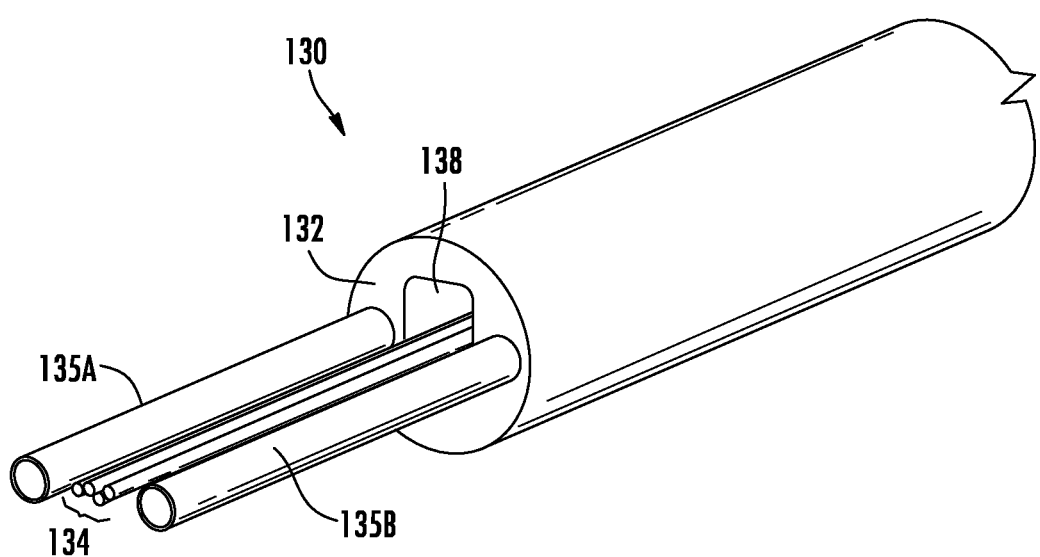
FIG. 3 is a partial cutaway view of an explanatory optical cable of the optical cable assembly depicted in FIG. 2A.

Referring now to FIG. 3, one non-limiting example of an optical cable 130 is illustrated with internal components exposed for explanatory purposes. It should be understood that other optical cable configurations may be utilized with the concepts disclosed, and the optical cable assembly depicted in FIG. 3 is used merely as an example. The optical cable 130 includes a polymer jacket 132 having an outer periphery and an inner periphery, with the inner periphery defining a slot 138. The slot 138 acts as an optical fiber envelope. The polymer jacket 132 may surround the slot 138 and the slot 138 may extend the entire length of the optical cable 130.

Data-carrying buffered optical fibers 134 are disposed within the slot 138 of the optical cable 130. The optical fibers 134 may be configured to pass optical signals back and forth along the optical cable 130. Any suitable number of optical fibers 134 may be included in the slot 138. The optical fibers 134 are free to translate within the slot 138 when the optical cable 130 is bent to move to a low-stress position. The shape of the slot 138 may be established so that no matter how the optical cable 130 is bent, the optical fibers 134 will never be bent below their minimum bend radius. Although the slot 138 is illustrated as rectangular, the shape and orientation of the slot 138 may also depend on the preferred bending and locations of other elements within the optical cable 130.

Each of the optical fibers 134 depicted in FIG. 1B may be surrounded by a polymer coating or jacket. In some optional embodiments, particularly optical cable assemblies configured as a hybrid optical cable capable of providing electrical power, one or more conductors may be disposed within the optical cable 130. For example, the conductors may be disposed within the slot 138 and span the entire length of the optical cable 130 (not shown) or be disposed within the jacket 132. In other embodiments, the conductors may be arranged within the polymer jacket 132 (e.g., the first and second strength members 135A, 135B described below).

In the illustrated embodiment, the optical cable 130 further includes a first strength element 135A and a second strength element 135B disposed within the polymer jacket 132 to provide increased rigidity to the optical cable 130, and prevent the optical fibers 134 from bending below their minimum bend radius. More or fewer strength elements may be utilized. The first and second strength members 135A, 135B may be any suitable material, such as, but not limited to, stranded stainless steel, copper, and aramid fibers (e.g., Kevlar, fiberglass, and the like). In some embodiments, the first strength element 135A and the second strength element 135B are electrically conductive and act as the electrical conductors described above to provide electrical power and/or data across the optical cable 130. The first and second strength elements 135A, 135 may also be used to secure the optical cable 130 to the cable attachment member 136. For example the first and second strength elements 125A, 135B may be coupled to mechanical features within the cable attachment member 136.

Figure 4A:
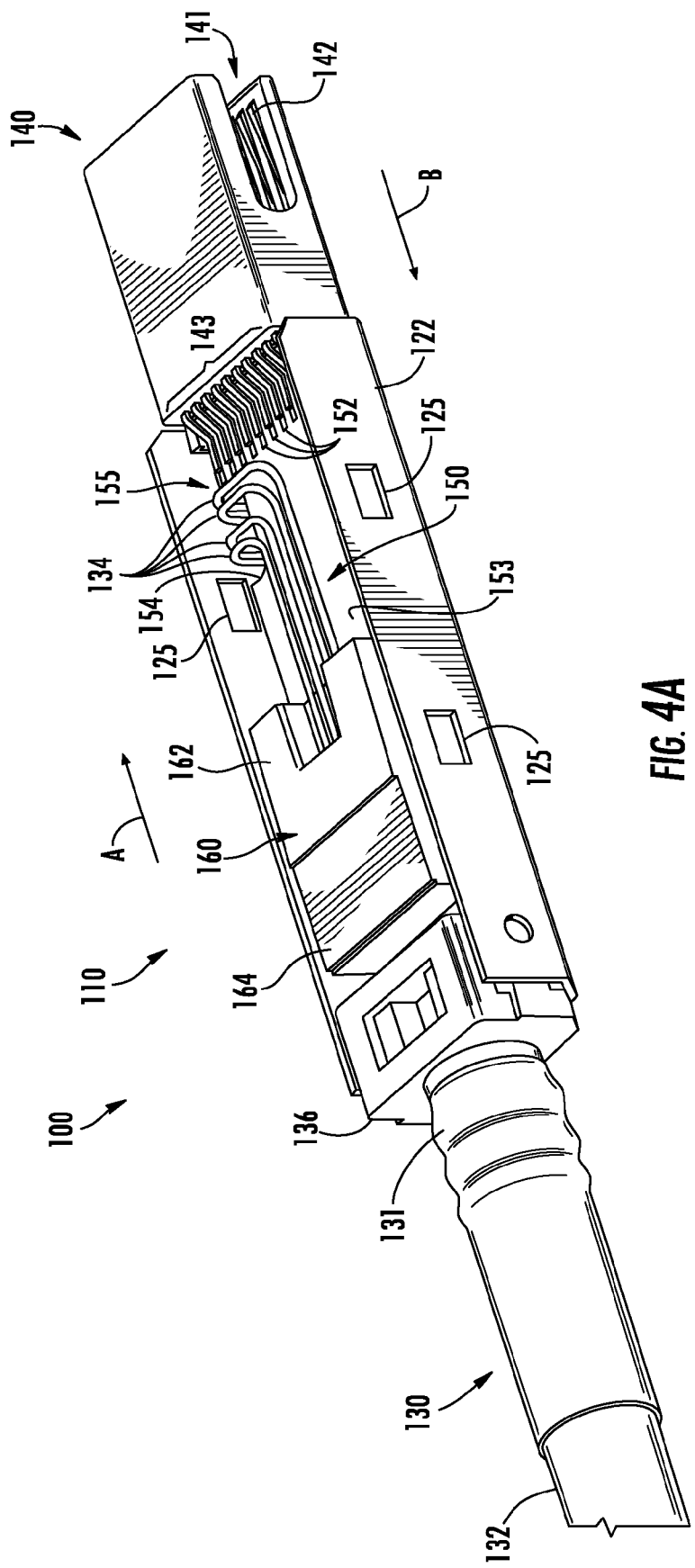
FIG. 4A is a rear top perspective view of the fiber optic connector assembly depicted in FIG. 2A with a portion of the connector housing removed and showing a reverse optical fiber loop.
Figure 4B:
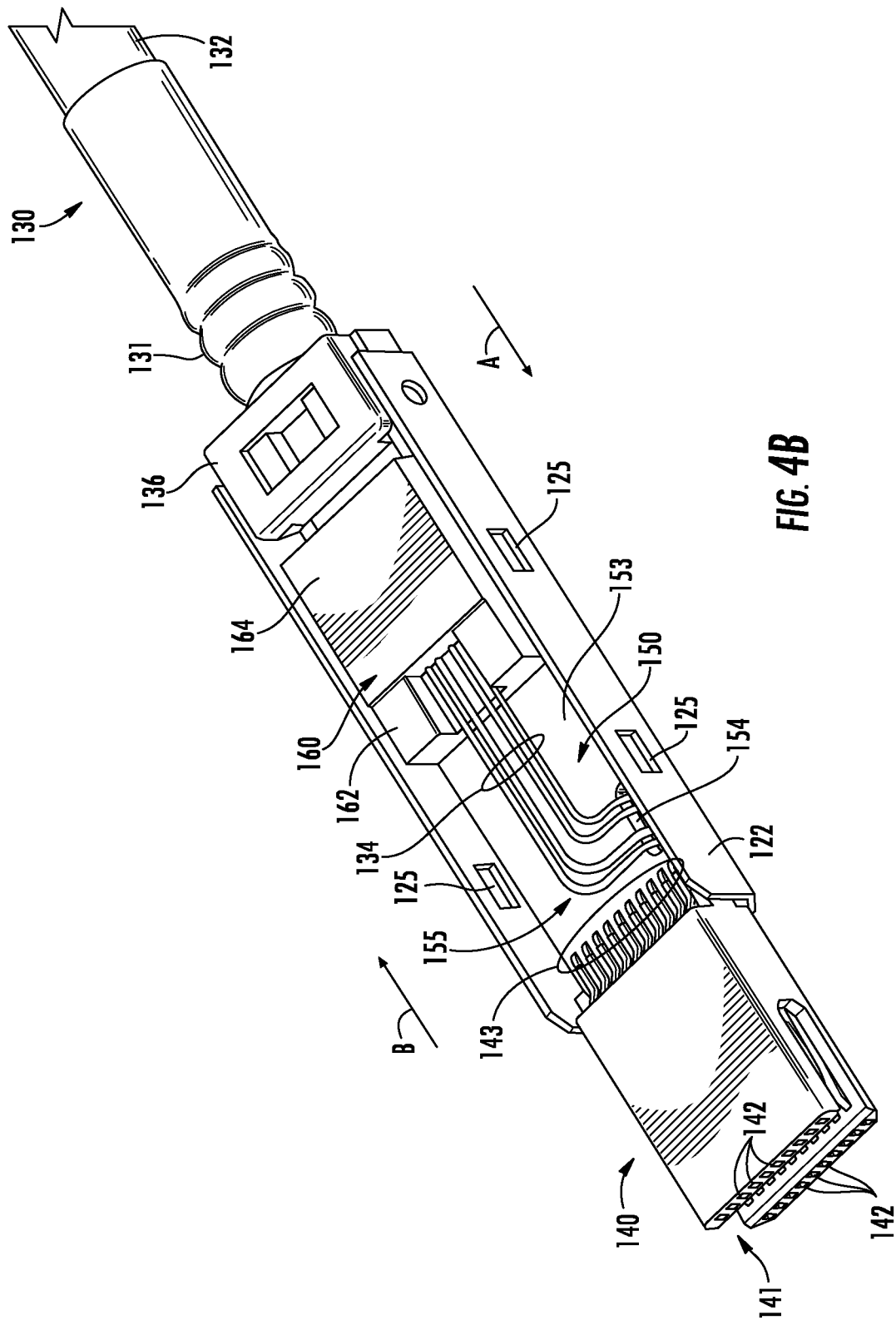
FIG. 4B is a front top perspective view of the fiber optic connector assembly depicted in FIG. 2A with a portion of the connector housing.
Figure 5A:
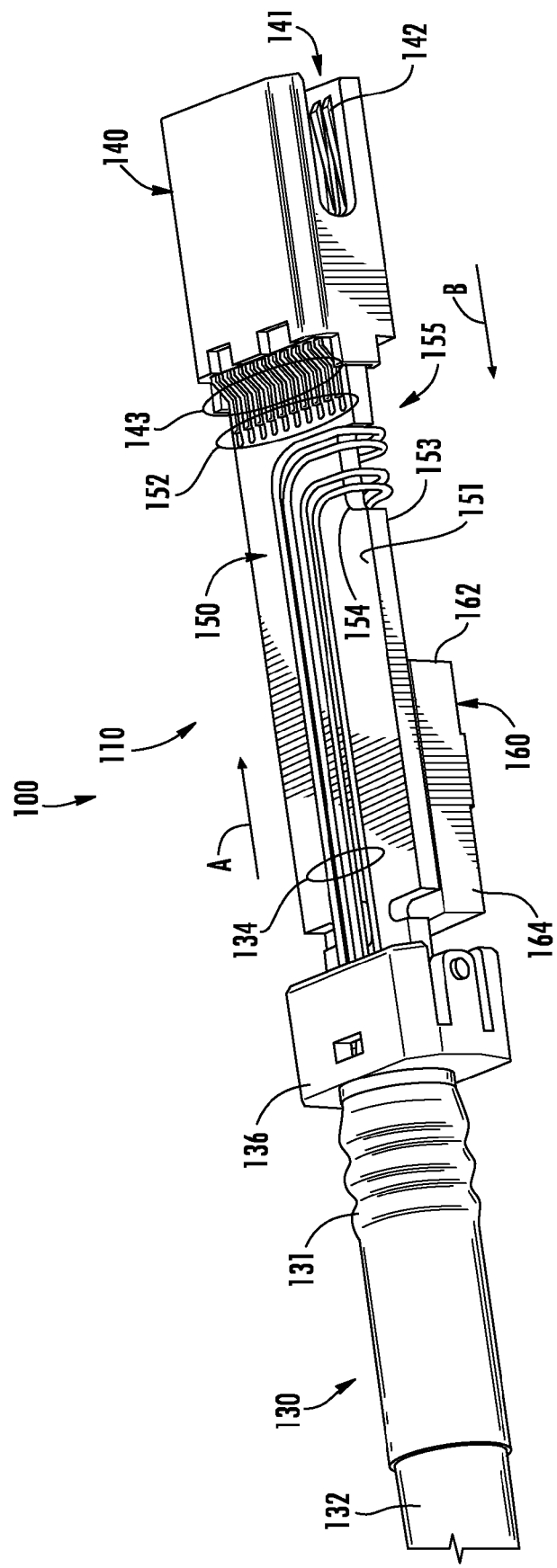
FIG. 5A is a rear, bottom perspective view of the fiber optic connector assembly depicted in FIG. 2A with the connector housing removed and having a reverse optical fiber loop.
Figure 5B:
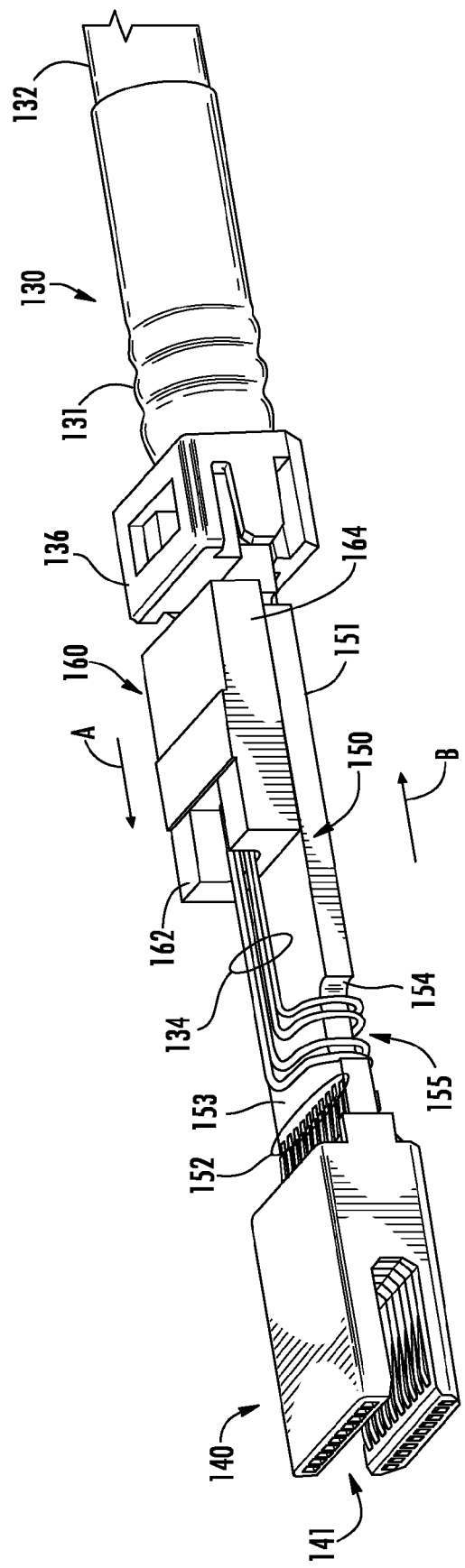
FIG. 5B is a front, top perspective view of the fiber optic connector assembly depicted in FIG. 2A with the connector housing removed to view the reverse optical fiber loop.

FIGS. 4A and 4B are perspective views of the fiber optic connector assembly 110 depicted in FIG. 2 with the second connector housing half 124 removed to reveal exemplary internal components within the connector. FIGS. 5A and 5B are perspective views of the fiber optic connector assembly 110 depicted in FIG. 2 with the entire connector housing 120 removed. Referring generally to FIGS. 4A-5B unless otherwise specified, the fiber optic connector assembly 110 includes a substrate 150, such as a printed circuit board (e.g., FR4), having a first surface 151 and a second surface 153 (see FIG. 5A). The substrate 150 supports a plurality of electrical and optical components, as well as conductive traces and vias to provide electrical power and route electronic signals. It should be understood that only selected electrical and optical components are depicted in FIGS. 4A-5B for the clarity of the illustration, and that additional components may be included as desired.

The second surface 153 of the substrate 150 supports a ferrule element 162 and a total internal reflection module 164. The total internal reflection module 164 is used to couple the optical fibers 134 to active components within the connector housing 120. As shown in the figures, the ferrule element 162 and the total internal reflection module 164 may be configured as a single optical coupling component 160. In other embodiments, the ferrule element 162 and the total internal reflection module 164 may be separate components. In yet other embodiments, the ferrule element 162 and/or the total internal reflection module 164 may not be included. For example, the optical fibers may be directly coupled to optical components, such as lenses, light emitting diodes, laser diodes, photodiodes, such as mounted on a leadframe, PCB or the like.

The first and second surfaces 151, 153 of the substrate also include conductive pads 152 to which electrical conductors 143 of the electrical connector are electrically coupled (e.g., by soldering). In this manner, electrical signals are passed from the electrical contacts 142 of the electrical to conductive traces on the substrate by way of electrical interface provided by the electrical conductors 143 and the conductive pads 152.

The ferrule element 162 may be configured to provide the function of routing the optical fibers 134 into a proper orientation to be received by the total internal reflection module 164. For example, the ferrule element 162 may position the optical fibers 134 to one side of the substrate 150 so that they avoid particular components mounted on the second surface 153. In some embodiments, the optical fibers 134 are bonded together by a soft compound to reduce routing impact and lessen the effects of vibration and shock due to external forces. The ferrule element 162 may include internal features to position fiber ends of the optical fiber to a proper location with respect to the total internal reflection module 164, as described below with reference to FIG. 6. The ferrule element 162 may also provide the function of securing the optical fibers 134 within the connector housing 120.

Figure 6:
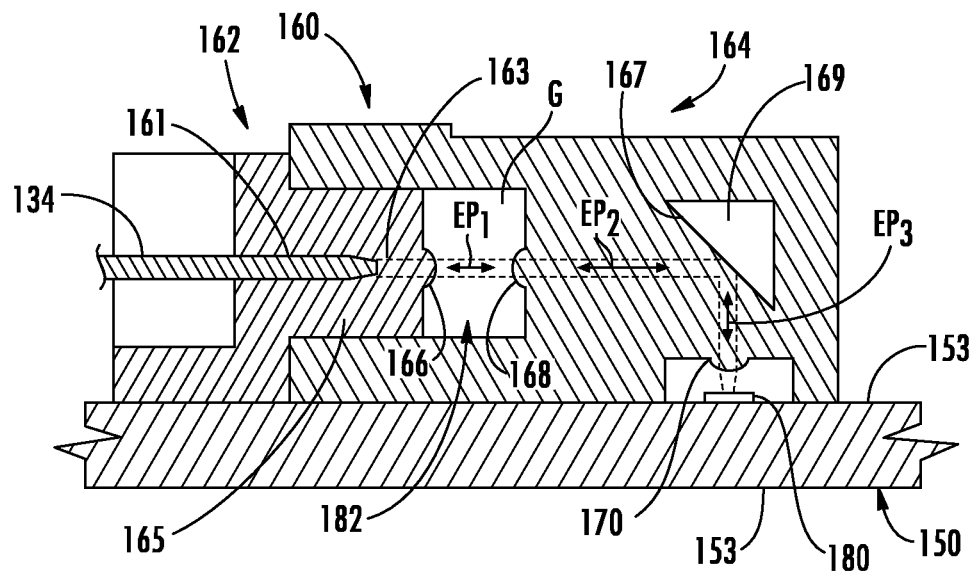
FIG. 6 is a cross sectional view of an optical coupling component within the fiber optic connector assembly depicted in FIG. 2A.

Referring now to FIG. 6, a cross sectional side view of the optical coupling component 160 depicted in FIGS. 4A-5B is provided. The optical coupling component 160 may be configured as any component capable of securing the optical fibers 134 and ensuring that the optical signals are passed between active components 180 and the optical fibers 134. It should be understood that embodiments of the present disclosure are not limited to the optical module depicted in FIG. 6. The illustrated ferrule element 162 has a mating portion 165 that is configured to be disposed within a receptacle 182 defined by the total internal reflection module 164 such that a gap G is present between the mating portion 165 and the total internal reflection module 164. Internal bores 161 extend within the mating portion 165 into which the optical fibers 134 are disposed. The optical fibers 134 are secured within the internal bores 161 (e.g., by an adhesive) such that the fiber ends terminate and are secured at a termination location 163 within the internal bores 161. A coupling face of the mating portion 165 includes a lens element 166 at the gap G.

The total internal reflection module 164 includes a lens 168 at the gap G to transmit and receive optical signals to and from the gap G. The total internal reflection module 164 further includes a total internal reflection surface 167 and a free space region 169 to reflect optical signals to and from the optical fibers 134. For example, an optical signal may propagate within the mating protrusion 165 of the ferrule element and pass into the gap G through lens element 166 as emission path $EP_1$. The optical signal is then received by lens element 168 such that it propagates toward the total internal reflection surface 167 within the optically transmissive material of the total internal reflection module 164 as emission path $EP_2$. The optical signal is then reflected off the total internal reflective surface 167 as emission path $EP_3$ by total internal reflection due to the change of the index of refraction between the material of the total internal reflection module 164 and the air within the open space region 169. The optical signal then passes through a lens element 170 and is received by a receiving active component 180 (e.g., a photodiode). Similarly, optical signals emitted by a transmitting active component 180 (e.g., a laser diode such as a vertical-external-cavity surface-emitting-laser (VECSEL)) passes into the optically transmissive total internal reflection module 164 through lens element 170 as emission path $EP_3$, is redirected by the angled total internal reflection surface 167 as emission path $EP_2$, passes through lens element 168 and into the gap G as emission path $EP_1$. The optical signal then passes through lens element 166 into the ferrule element 162 where it is then received by one of the optical fibers 134. The active components may be coupled to the substrate 150 directly, or be provided on a separate daughter board that is then electrically coupled to the substrate 150 (e.g., by a flex circuit).

It should be understood that the optical coupling component 160 depicted in FIG. 6 is for exemplary purposes only, and that other optical coupling arrangements may be utilized such as attaching the fiber directly to the substrate, or the like. For example, in some embodiments the optical fibers may be secured within the connector housing 120 and coupled to active components by butt coupling methods.

Referring once again to FIGS. 4A-5B, in the illustrated embodiment, the substrate 150 includes an optional notch 154 located on one side. The notch 154 is positioned and sized such that it, along with the first half connector housing 122, defines an opening through which the optical fibers 134 may pass from the first surface 151 to the second surface of the substrate 150. As is best shown in FIG. 5A, the optical fibers enter the connector housing 120 (not visible in FIG. 5A) from the cable attachment member 136 where they then pass over the first surface 151 of the substrate 150 in a first direction A. The optical fibers 134 then turn toward and through the notch 154 where they then pass to the second surface 153 of the substrate 150. As is best shown in FIG. 5B, the optical fibers then change from the first direction A to a second direction B and pass over the second surface 153 of the substrate 150. The optical fibers 134 then terminate within the optical coupling component 160 (e.g., as described above with respect to FIG. 6). Thus, the routing of the optical fibers 134 form a reverse optical fiber loop 155 within the connector housing 120. In some embodiments, additional components, such as posts or guides, may be provided on the first and second surfaces 151, 153 of the substrate 150 to properly route the optical fibers.

For example, posts may be provided on the first and second surfaces 151, 153 to achieve the right angles (or other angles) that define the reverse optical fiber loop 155.

Through features other than a notch may be provided in the substrate 150 to route the optical fibers 134 from the first surface 151 to the second surface 153. For example, in other embodiments, one or more through-holes may be provided to allow the optical fibers 134 to pass from the first surface 151 to the second surface 153.

The reverse optical fiber loop 155 arrangement enables a longer length of the optical fibers within the connector housing 120, which aids in isolating tensile and thermal coefficient of expansion effects from the optical components. Small changes in optical fiber length due to tension on the fiber, thermal effects, or other factors, may shorten the reverse optical fiber loop 155 rather than applying stress on the optical components. Because the optical fibers 134 enter the connector housing 120 in a first direction and are secured in a second direction, a longer length of optical fibers 134 to pass may be utilized without increasing the overall size of the optical connector.

It is noted that terms like "typically," when utilized herein, are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "substantially," "approximately" and "about" are utilized herein to represent the inherent degree of uncertainty that may be attributed to any quantitative comparison, value, measurement, or other representation.

The invention claimed is:

1. A fiber optic connector assembly comprising:
    an optical fiber having a fiber end; and
    a connector housing, wherein the optical fiber enters the connector housing from a first direction and is secured within the connector housing in a second direction such that the optical fiber forms a reverse optical fiber loop within the connector housing, wherein the optical fiber of the reverse optical fiber loop is free to move within the connector housing.

2. The fiber optic connector assembly of claim 1, wherein the first direction is substantially opposite from the second direction.

3. The fiber optic connector assembly of claim 1, further comprising a substrate comprising a first surface and a second surface, wherein the optical fiber enters the connector housing over the first surface of the substrate, and is secured within the connector housing at the second surface of the substrate.

4. The fiber optic connector assembly of claim 1, further comprising a substrate comprising a first surface, a second surface, and a notch, wherein the optical fiber enters the connector housing over the first surface of the substrate, passes through the notch, and is secured within the connector housing at the second surface of the substrate.

5. The fiber optic connector assembly of claim 4, wherein the connector housing and the substrate define an opening at the notch through which the optical fiber passes.

6. The fiber optic connector assembly of claim 1, wherein the fiber end is optically coupled to an optical component within the connector housing.

7. The fiber optic connector assembly of claim 6, wherein the optical component is a lens or an active component.

8. The fiber optic connector assembly of claim 1, further comprising a total internal reflection module within the connector housing and configured to turn an optical signal from a first direction of propagation to a second direction of propagation, wherein the fiber end is secured within the connector housing at the total internal reflection module.

9. The fiber optic connector assembly of claim 8, further comprising an active component optically coupled to the total internal reflection module.

10. The fiber optic connector assembly of claim 1, further comprising an electrical connector coupled to the connector housing.

11. The fiber optic connector assembly of claim 1, further comprising:
    a substrate comprising a first surface and a second surface, wherein the optical fiber enters the connector housing on the first surface of the substrate; and
    a total internal reflection module coupled to the second surface, wherein the optical fiber turns from the first surface to the second surface and is coupled to the total internal reflection module.

12. The fiber optic connector assembly of claim 11, further comprising a ferrule element coupled to the second surface, wherein the optical fiber passes through the ferrule element prior to the total internal reflection module.

13. The fiber optic connector assembly of claim 11, wherein the ferrule element and the total internal reflection module are configured as a unitary component.

14. The fiber optic connector assembly of claim 11, wherein the fiber optic connector assembly comprises multiple optical fibers that enter the connector housing in a first direction and are secured within the connector housing in a second direction.

15. The fiber optic connector assembly of claim 11, further comprising an optical cable comprising an outer jacket, wherein the outer jacket comprises a slot that spans the length of the optical cable within an inner periphery, and the optical fiber is disposed within the slot.

16. A fiber optic connector assembly comprising:
    an optical fiber having a fiber end;
    a connector housing; and
    a substrate within the connector housing, the substrate comprising a first surface and a second surface, wherein the optical fiber enters the connector housing over the first surface of the substrate, and is secured within the connector housing at the second surface of the substrate, wherein the substrate is a circuit board and the optical fiber forms a reverse optical fiber loop within the connector housing, wherein the optical fiber of the reverse optical fiber loop is free to move within the connector housing.

17. The fiber optic connector assembly of claim 16, wherein the substrate further comprises a notch, wherein the optical fiber enters the connector housing over the first surface of the substrate, passes through the notch, and is secured within the connector housing at the second surface of the substrate.

18. The fiber optic connector assembly of claim 16, further comprising a total internal reflection module coupled to the second surface of the substrate and configured to turn an optical signal from a first direction of propagation to a second direction of propagation, wherein the fiber end is coupled to the total internal reflection module.

19. The fiber optic connector assembly of claim 18, further comprising an active component optically coupled to the total internal reflection module.

20. A fiber optic connector assembly comprising:
- an optical fiber having a fiber end;
- a connector housing;
- a substrate within the connector housing, the substrate comprising a first surface and a second surface, wherein the optical fiber enters the connector housing over the first surface of the substrate in a first direction;
- a total internal reflection module coupled to the second surface of the substrate, wherein the fiber end is coupled to the total internal reflection module in a second and the optical fiber forms a reverse optical fiber loop within the connector housing, wherein the optical fiber of the reverse optical fiber loop is free to move within the connector housing;
- an active component coupled to the second surface of the substrate and optically coupled to the total internal reflection module, wherein the active component is configured to transmit and/or receive optical signals to and/or from the optical fiber; and
- an electrical connector coupled to the connector housing and electrically coupled to the active component.

* * * * *